US011275632B2

(12) United States Patent
Christidis et al.

(10) Patent No.: US 11,275,632 B2
(45) Date of Patent: Mar. 15, 2022

(54) BROADCAST COMMAND AND RESPONSE

(71) Applicants: Advanced Micro Devices, Inc., Santa Clara, CA (US); ATI Technologies ULC, Markham (CA)

(72) Inventors: Kostantinos Danny Christidis, Toronto (CA); Lei Zhang, Richmond Hill (CA); Sateesh Lagudu, Hyderabad (IN); Purushotham Niranjan Dasiga, Hyderabad (IN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 68 days.

(21) Appl. No.: 16/171,451

(22) Filed: Oct. 26, 2018

(65) Prior Publication Data

US 2020/0089550 A1  Mar. 19, 2020

(30) Foreign Application Priority Data

Sep. 14, 2018 (IN) .............................. 201811034625

(51) Int. Cl.
*G06F 9/30* (2018.01)
*G06F 9/54* (2006.01)
*G06N 3/08* (2006.01)

(52) U.S. Cl.
CPC ............... *G06F 9/546* (2013.01); *G06N 3/08* (2013.01)

(58) Field of Classification Search
None
See application file for complete search history.

(56) References Cited

U.S. PATENT DOCUMENTS

| 4,727,537 A | 2/1988 | Nichols |
| 5,379,297 A | 1/1995 | Glover et al. |
| 5,440,547 A | 8/1995 | Easki et al. |
| 5,784,003 A | 7/1998 | Dahlgren |
| 5,857,078 A | 1/1999 | Date |

(Continued)

FOREIGN PATENT DOCUMENTS

| EP | 1052816 A2 | 11/2000 |
| WO | 9703549 A2 | 2/1997 |

OTHER PUBLICATIONS

International Search Report for PCT/US02/26813, dated Oct. 30, 2002, 6 pages.

*Primary Examiner* — Corey S Faherty
(74) *Attorney, Agent, or Firm* — Kowert Hood Munyon Rankin and Goetzel PC; Rory D. Rankin (57) ABSTRACT

Systems, apparatuses, and methods for implementing a broadcast read response protocol are disclosed. A computing system includes a plurality of processing engines coupled to a memory subsystem. A first processing engine executes a read and broadcast response command, wherein the read and broadcast response command targets first data at a first address in the memory subsystem. One or more other processing engines execute a wait command to wait to receive the first data requested by the first processing engine. After receiving the first data from the memory subsystem, the plurality of processing engines process the first data as part of completing a first operation. In one implementation, the first operation is implementing a given layer of a machine learning model. In one implementation, the given layer is a convolutional layer of a neural network.

20 Claims, 7 Drawing Sheets

(56) References Cited

U.S. PATENT DOCUMENTS

| | | | |
|---|---|---|---|
| 5,892,766 A | 4/1999 | Wicki et al. |
| 5,898,687 A | 4/1999 | Harriman et al. |
| 5,901,147 A | 5/1999 | Joffe |
| 5,905,998 A | 5/1999 | Ebrahim et al. |
| 5,915,104 A | 6/1999 | Miller |
| 5,918,074 A | 6/1999 | Wright et al. |
| 5,970,229 A | 10/1999 | Thomas et al. |
| 6,295,295 B1 | 9/2001 | Wicklund |
| 6,304,570 B1 | 10/2001 | Sakurai et al. |
| 6,396,809 B1 | 5/2002 | Holden et al. |
| 6,417,944 B1 | 7/2002 | Lahat et al. |
| 6,484,224 B1 | 11/2002 | Robins et al. |
| 6,542,502 B1 | 4/2003 | Herring et al. |
| 6,553,446 B1 | 4/2003 | Miller |
| 6,556,571 B1 | 4/2003 | Shahrier et al. |
| 6,611,519 B1 | 8/2003 | Howe |
| 6,629,147 B1 | 9/2003 | Grow |
| 6,654,346 B1 | 11/2003 | Mahalingaiah et al. |
| 6,661,774 B1 | 12/2003 | Lauffenburger et al. |
| 6,674,754 B1 | 1/2004 | Ofek |
| 6,687,247 B1 | 2/2004 | Wilford et al. |
| 6,735,679 B1 | 5/2004 | Herbst et al. |
| 6,745,277 B1 | 6/2004 | Lee et al. |
| 6,751,698 B1 | 6/2004 | Deneroff et al. |
| 6,754,211 B1 | 6/2004 | Brown |
| 6,754,222 B1 | 6/2004 | Joung et al. |
| 6,760,337 B1 | 7/2004 | Snyder, II et al. |
| 6,768,717 B1 | 7/2004 | Reynolds et al. |
| 6,781,994 B1 | 8/2004 | Nogami et al. |
| 6,907,001 B1 | 6/2005 | Nakayama et al. |
| 6,912,637 B1 | 6/2005 | Herbst |
| 6,940,814 B1 | 9/2005 | Hoffman |
| 6,950,394 B1 | 9/2005 | Chou et al. |
| 6,950,430 B2 | 9/2005 | Kalkunte et al. |
| 6,952,401 B1 | 10/2005 | Kadambi et al. |
| 6,959,002 B2 | 10/2005 | Wynne et al. |
| 6,975,638 B1 | 12/2005 | Chen et al. |
| 6,996,099 B1 | 2/2006 | Kadambi et al. |
| 6,999,415 B2 | 2/2006 | Luijten et al. |
| 7,002,926 B1 | 2/2006 | Eneboe et al. |
| 7,145,869 B1 | 12/2006 | Kadambi et al. |
| 7,274,692 B1 | 9/2007 | Hughes |
| 9,817,594 B2 * | 11/2017 | Holbrook | G06F 12/1081 |
| 9,836,412 B2 * | 12/2017 | McConnell | G06F 15/17337 |
| 10,459,859 B2 * | 10/2019 | Jain | G06F 13/4068 |
| 2003/0035371 A1 | 2/2003 | Reed et al. |
| 2011/0314255 A1 | 12/2011 | Krishna et al. |

\* cited by examiner

| Command Type Encoding Field 405 | Command Type Description 410 | Target Encoding Field 415 | Target Description 420 |
|---|---|---|---|
| 00 | Read with Broadcast Response | 00 | Send to All N Masters |
| 01 | Read | 01 | Send to First N/2 Masters |
| 10 | Write | 10 | Send to Last N/2 Masters |
| ... | ... | ... | ... |

Memory Transaction Format Table 400

BROADCAST COMMAND AND RESPONSE

PRIORITY INFORMATION

This application claims benefit of priority to Indian Application No. 201811034625, entitled "Broadcast Command and Response", filed on Sep. 14, 2018, the entirety of which is incorporated herein by reference.

BACKGROUND

Description of the Related Art

Processors (i.e., processing units) perform computational tasks in a wide variety of applications. A typical application includes software instructions that are executed by any number of processors. The software instructions often cause the processor(s) to fetch data from a memory subsystem, perform operations on the fetched data, generate a result, and then write the result back to the memory subsystem.

The memory subsystem is a shared resource and has a finite throughput capability. The interface to the memory subsystem includes a group of wires that are operating at a certain clock frequency. Every time a memory transaction is issued, those wires are occupied for a particular number of clock cycles. As used herein, a "memory transaction" or simply "transaction" refers to a command or request to read, write, or modify content (e.g., data or instructions) stored in a memory location corresponding to a particular address. In various implementations, the address is provided as a logical address, a physical address, or either. Furthermore, a "load memory transaction" or "load memory operation" refers to a transfer of data from memory to a processing engine while a "store memory transaction" or "store memory operation" refers to a transfer of data from the processing engine to memory.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a broadcast read response protocol are disclosed herein. In one implementation, a computing system includes at least a host processing unit, a plurality of processing engines, and a hub coupled to a memory subsystem. The host processing unit conveys a read and broadcast response command for execution by a first processing engine and a wait command for execution by one or more other processing engines in response to detecting a first condition. In one implementation, the first condition is detecting the execution of a machine learning model which includes a plurality of inference engines processing common data. The first processing engine conveys a read and broadcast response request to the hub, which then sends a read request to the memory subsystem for first data. After receiving the first data from the memory subsystem, the hub broadcasts the first data to the plurality of processing engines. The plurality of processing engines process the first data as part of completing a first operation and then send an indication to the host processing unit when the first operation has been completed. In one example, the first operation is the implementation of a given layer of a machine learning model (e.g., a convolutional neural network).

Figure 1:
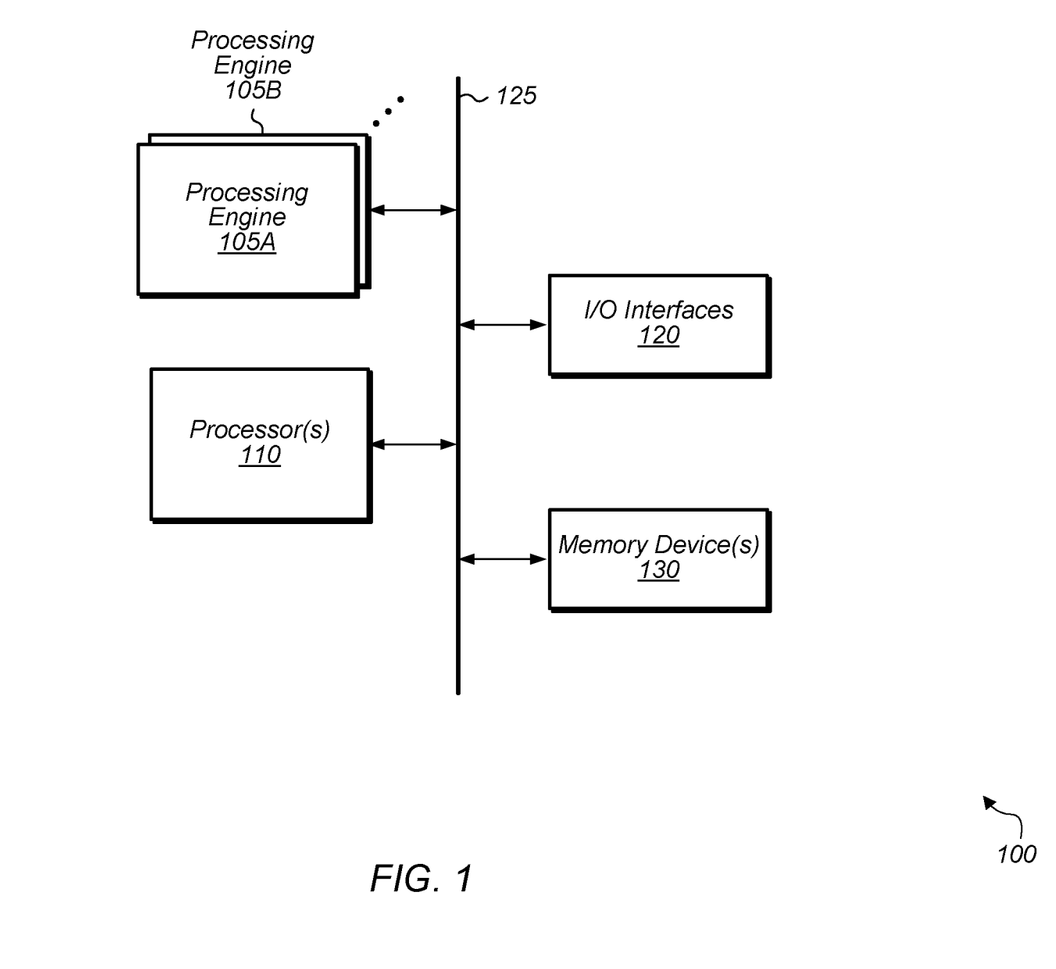
FIG. 1 is a block diagram of one implementation of a computing system.

Referring now to FIG. 1, a block diagram of one implementation of a computing system 100 is shown. In one implementation, computing system 100 includes at least processing engines 105A-B, processor(s) 110, input/output (I/O) interfaces 120, bus 125, and memory device(s) 130. It is noted that processing engines 105A-B include any number of processing engines for executing various types of software applications. In other implementations, computing system 100 includes other components and/or computing system 100 is arranged differently.

In various implementations, processing engines 105A-B include logic for implementing any of various machine learning algorithms or machine learning models. In one implementation, processing engines 105A-B implement one or more layers of a convolutional neural network. For example, in this implementation, processing engines 105A-B implement one or more convolutional layers and/or one or more fully connected layers. In another implementation, processing engines 105A-B implement one or more layers of a recurrent neural network. In one implementation, each processing engine 105A-B is an inference engine. Generally speaking, an "inference engine" is defined as hardware and/or software which receives image data and generates one or more label probabilities for the image data. In some cases, an "inference engine" or is referred to as a "classification engine" or a "classifier".

In one implementation, processing engines 105A-B implement a trained neural network. For example, in this implementation, processing engines 105A-B analyze a video frame to generate one or more label probabilities for the video frame. For example, potential use cases include at least eye tracking, object recognition, point cloud estimation, ray tracing, light field modeling, depth tracking, and others. For eye tracking use cases, probabilities generated by processing engines 105A-B are based on learned patterns, dwell, transition angles, blink, etc. In other implementations, processing engines 105A-B are customized for other types of use cases. In other implementations, processing engines 105A-B execute other types of software models or algorithms besides machine learning models.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with the model implemented by processing engines 105A-B is performed by processor(s) 110. Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processing engines 105A-B and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
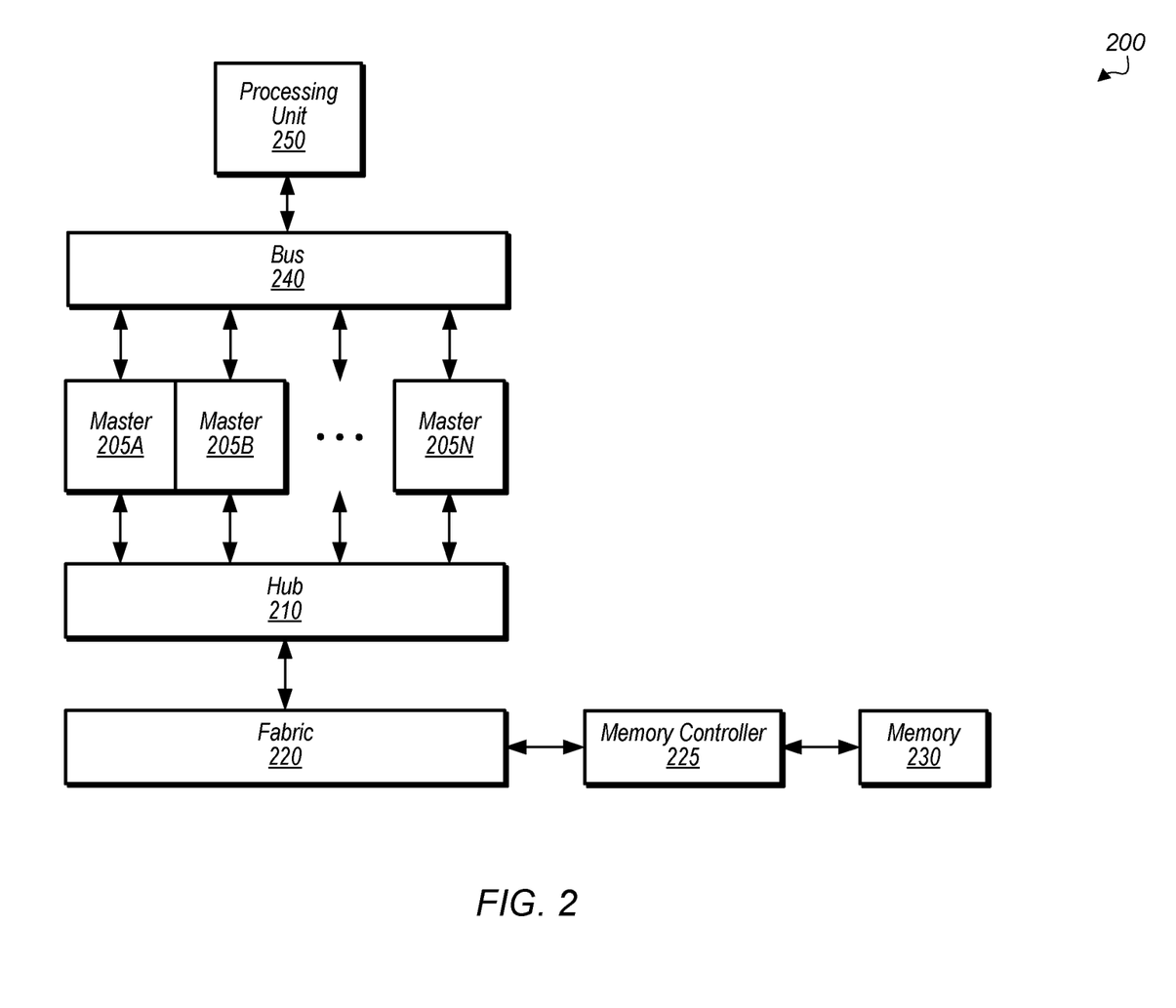
FIG. 2 is a block diagram of another implementation of a computing system.

Turning now to FIG. 2, a block diagram of another implementation of a computing system 200 is shown. In one implementation, computing system includes processing unit 250 and masters 205A-N coupled to bus 240. In one implementation, processing unit 250 executes higher-level software to control the operations of computing system 200. As part of executing the higher-level software, processing unit 250 conveys instructions to be executed by masters 205A-N. Processing unit 250 is representative of any type of processing unit (e.g., central processing unit (CPU), field programmable gate array (FPGA), application specific integrated circuit (ASIC)). Masters 205A-N are representative of any number and type of processing engines for executing different types of instructions. Each master 205A-N is implemented using any suitable combination of hardware and/or software.

In one implementation, processing unit 250 sends instructions to masters 205A-N via bus 240, wherein the instructions are executable by masters 205A-N. In one implementation, bus 240 is a peripheral component interconnect express (PCIe) bus. In other implementations, bus 240 is any of various other types of buses or interconnects. Masters 205A-N are coupled to hub 210 which is representative of any type of hub for connecting masters 205A-N to other components of system 200. In one implementation, hub 210 functions as a crossbar allowing masters 205A-N to connect to a variety of other components. Hub 210 is coupled to fabric 220, which is representative of any type of interconnect fabric. In some cases, hub 210 and fabric 220 are combined together into a single component, with the single component referred to as either a hub or a fabric. Transactions targeting memory 230 are conveyed through hub 210 and fabric 220 to memory controller 225.

In one implementation, processing unit 250 determines if the instructions being executed by masters 205A-N will result in masters 205A-N accessing a shared resource in memory 230. If processing unit 250 determines that masters 205A-N will be accessing a shared resource (i.e., the same data stored in memory 230), processing unit 250 designates one of masters 205A-N as the primary master responsible for executing a read and broadcast response command to fetch the data from memory 230. Then, the fetched data is sent to a plurality of masters 205A-N which will be executing instructions to operate on this data. Designating one of the masters as the primary master and only sending a single transaction to memory 230 helps to reduce the overall number of memory transactions sent to memory 230. By reducing the number of memory transactions sent to memory 230, power consumption is reduced and the latency of processing memory transactions is also reduced.

Figure 3:
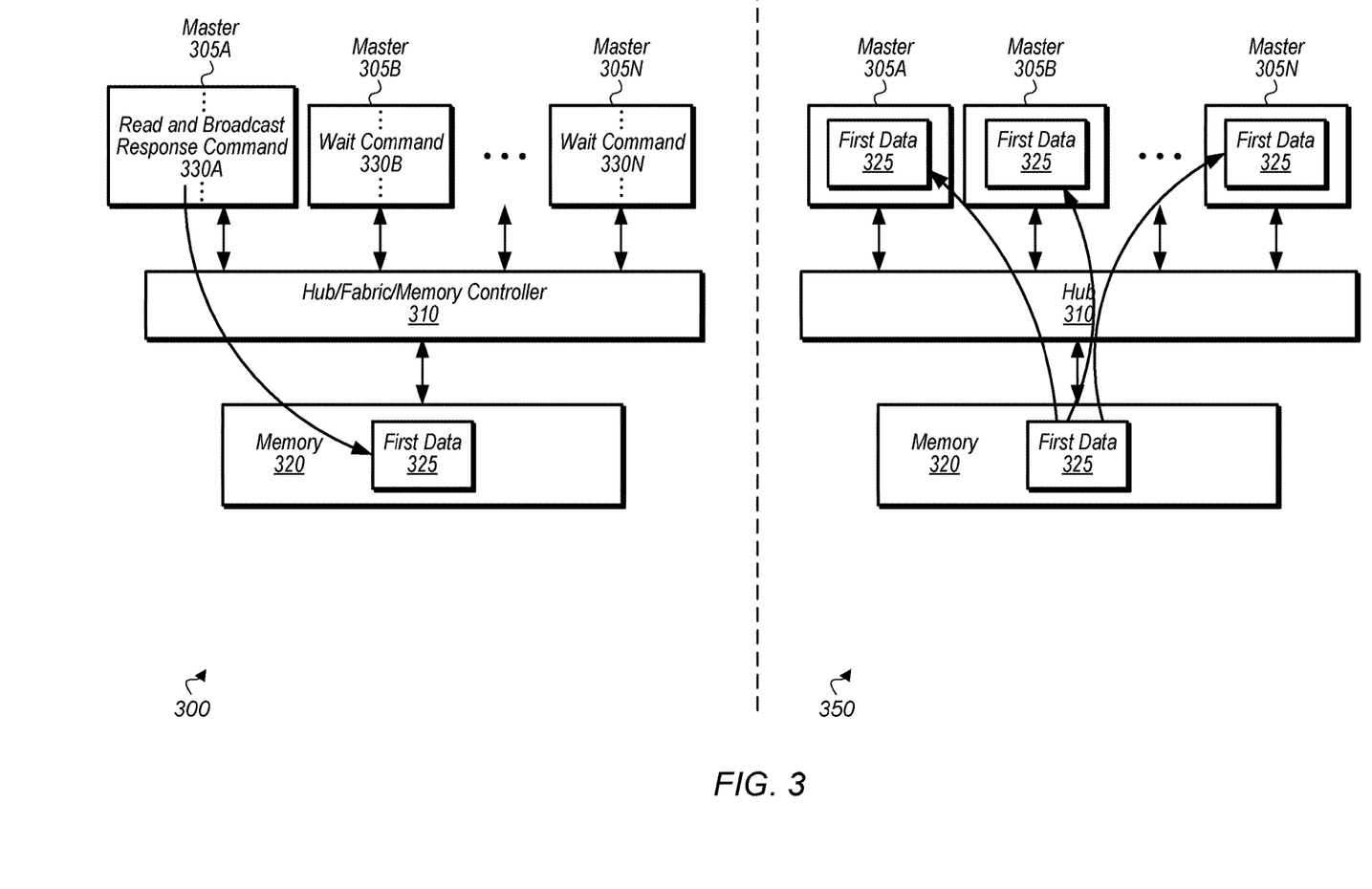
FIG. 3 is a block diagram of one implementation of the execution of a read and broadcast response command.

Referring now to FIG. 3, a block diagram of one implementation of the execution of a read and broadcast response command is shown. A first scenario 300 is shown on the left-side of FIG. 3. A group of masters 305A-N are setup to operate on the same set of data which is represented by first data 325. One master, in this case master 305A, issues a read and broadcast response command 330A while the other masters 305B-N execute wait commands 330B-N, respectively. Read and broadcast response command 330A is representative of any number of read and broadcast response commands which are issued to read and broadcast blocks of data from first data 325 to masters 305A-N. Master 305A issues broadcast read command 330A to memory 320 via hub/fabric/memory controller 310. It should be understood that while hub/fabric/memory controller 310 is shown as a single component, this is shown merely for ease of representation, and hub/fabric/memory controller 310 can be split up into any number of separate components in the actual implementation.

In one implementation, the original set of instructions to be executed by masters 305A-N include a traditional read instruction targeting first data 325 to be executed by each master 305A-N. In other words, each master 305A-N includes a traditional read instruction which targets first data 325. In this implementation, a processing unit (e.g., processing unit 250 of FIG. 2) converts the read instruction into read and broadcast response command 330A for master 305A. Also, for the other masters 305B-N, the processing unit converts their read instructions into wait commands 330B-N, respectively.

A second scenario 350 on the right-side of FIG. 3 illustrates the result of the broadcast read command 330A being issued to memory 320 by master 305A. First data 325 is read from memory 320 and broadcast to each of masters 305A-N. Each master 305A-N then performs any number of operations on first data 325 as part of a higher-level software application. In one implementation, masters 305A-N operate on first data 325 as part of the implementation of a machine learning model. In other implementations, masters 305A-N operate on first data 325 as part of other types of applications.

Figure 4:
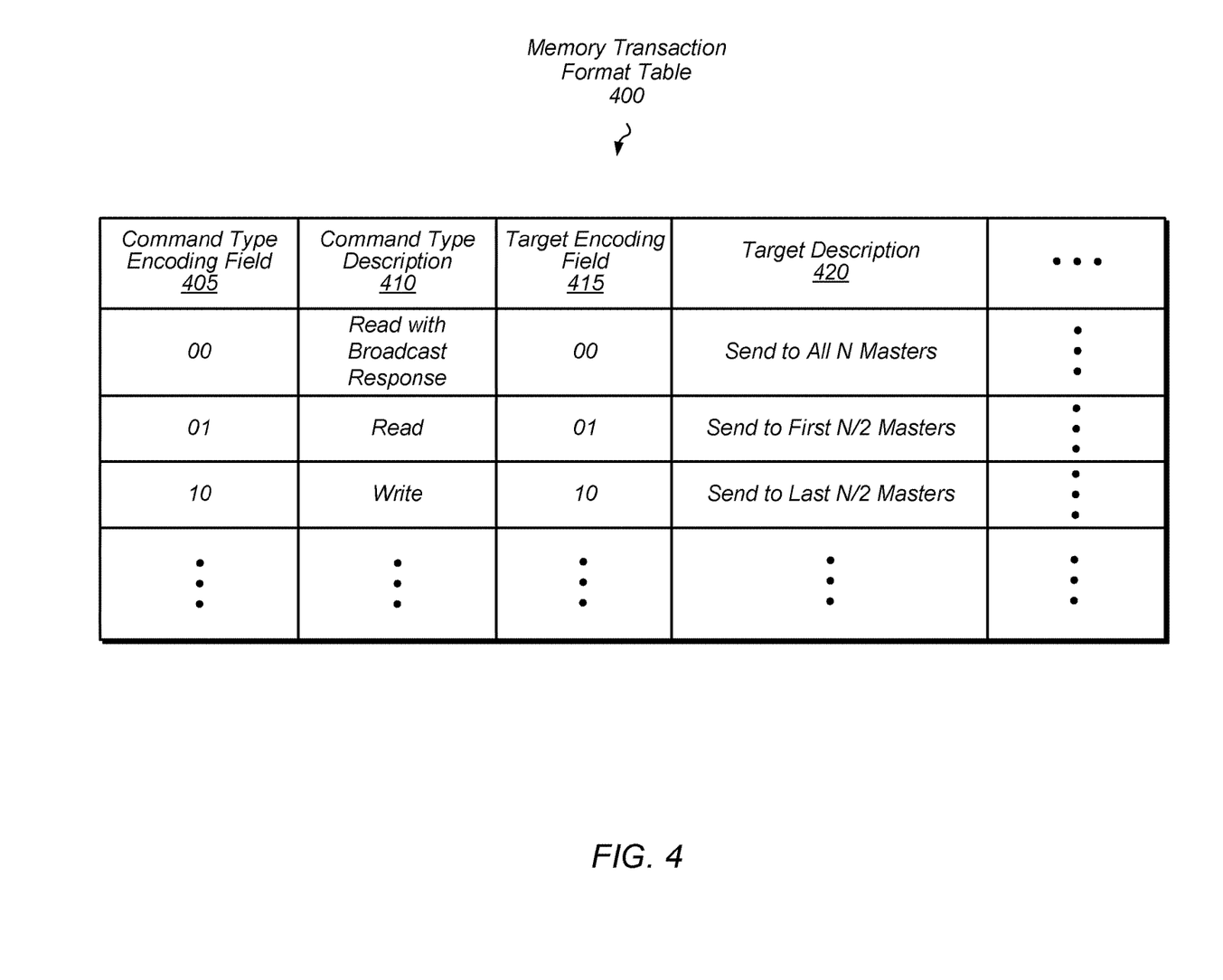
FIG. 4 is a block diagram of one implementation of a memory transaction format table for a broadcast read response protocol.

Turning now to FIG. 4, one implementation of a memory transaction format table 400 for a broadcast read response protocol is shown. Memory transaction format table 400 illustrates the format of a memory transaction in accordance with one implementation. In one implementation, each memory transaction includes a command type encoding field 405. In one implementation, if the command type encoding field 405 is equal to "00", then the transaction is a read with broadcast response transaction, as indicated by command type description 410. If the command type encoding field 405 is equal to "01", then the transaction is a normal read transaction with the response going to a single master and if the command type encoding field 405 is equal to "10", then the transaction is a write transaction. In other implementations, other encodings can be used to indicate the various types of transactions.

In one implementation, each transaction includes a target encoding field 415. In one implementation, the target encoding field 415 only has relevance when the transaction is a read and broadcast response transaction. For example, if the target encoding field 415 is equal to "00", then the read response is sent to all N masters of the computing system, as indicated by target description field 420. It is assumed for the purposes of this implementation that there are N masters in the computing system, wherein N is a positive integer greater than one. If the target encoding field 415 is equal to "01", then the read response is sent to the first N/2 masters of the computing system. If the target encoding field 415 is equal to "10", then the read response is sent to the last N/2 masters of the computing system. In other implementations, target encoding field 415 can have other numbers of bits to include other ways of directing the read response to other groups of masters. In other implementations, the transaction format does not include a target encoding field 415. Each transaction can also include any number of other fields in various implementations.

Figure 5:
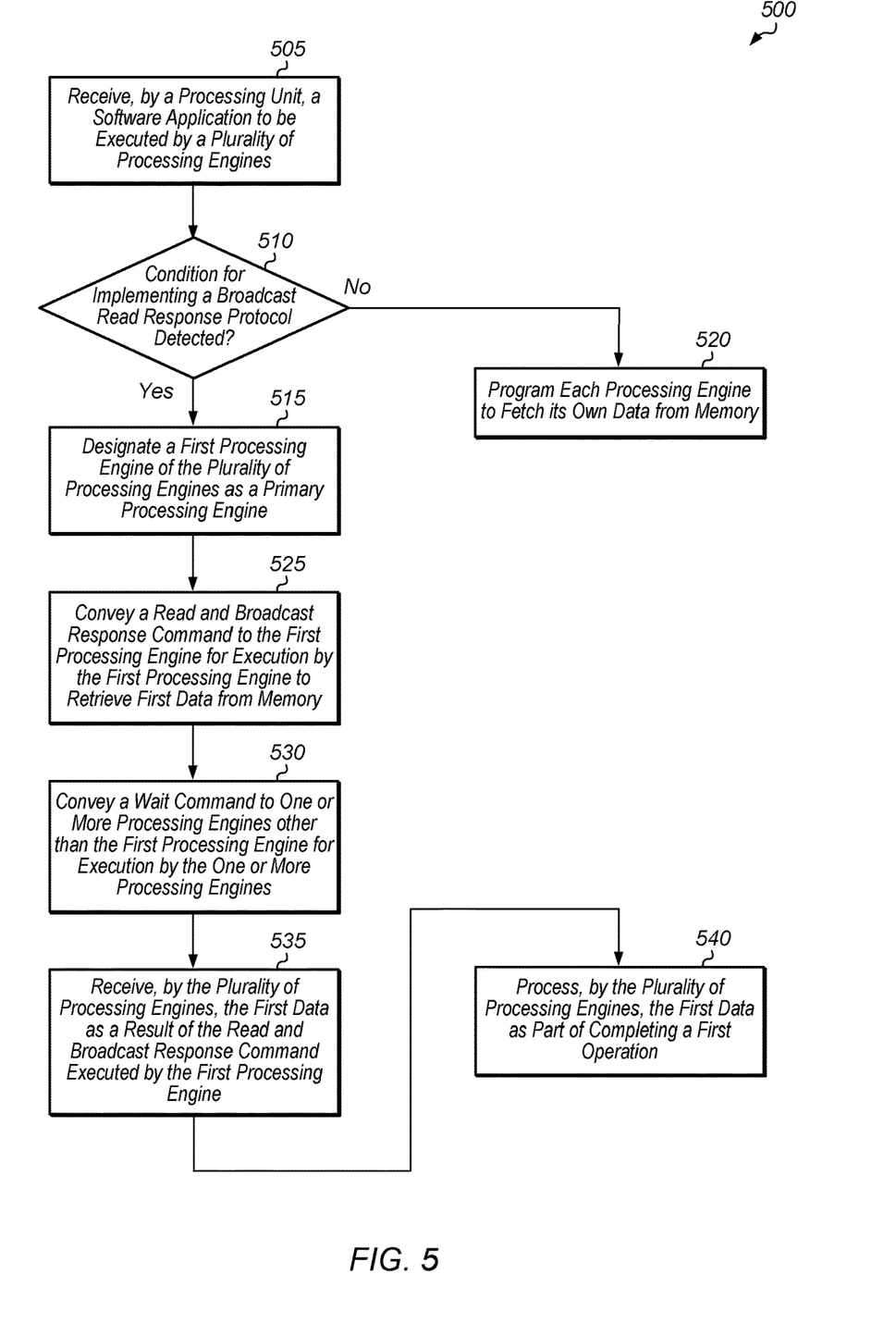
FIG. 5 is a generalized flow diagram illustrating one implementation of a method for implementing a broadcast read response protocol.
Figure 6:
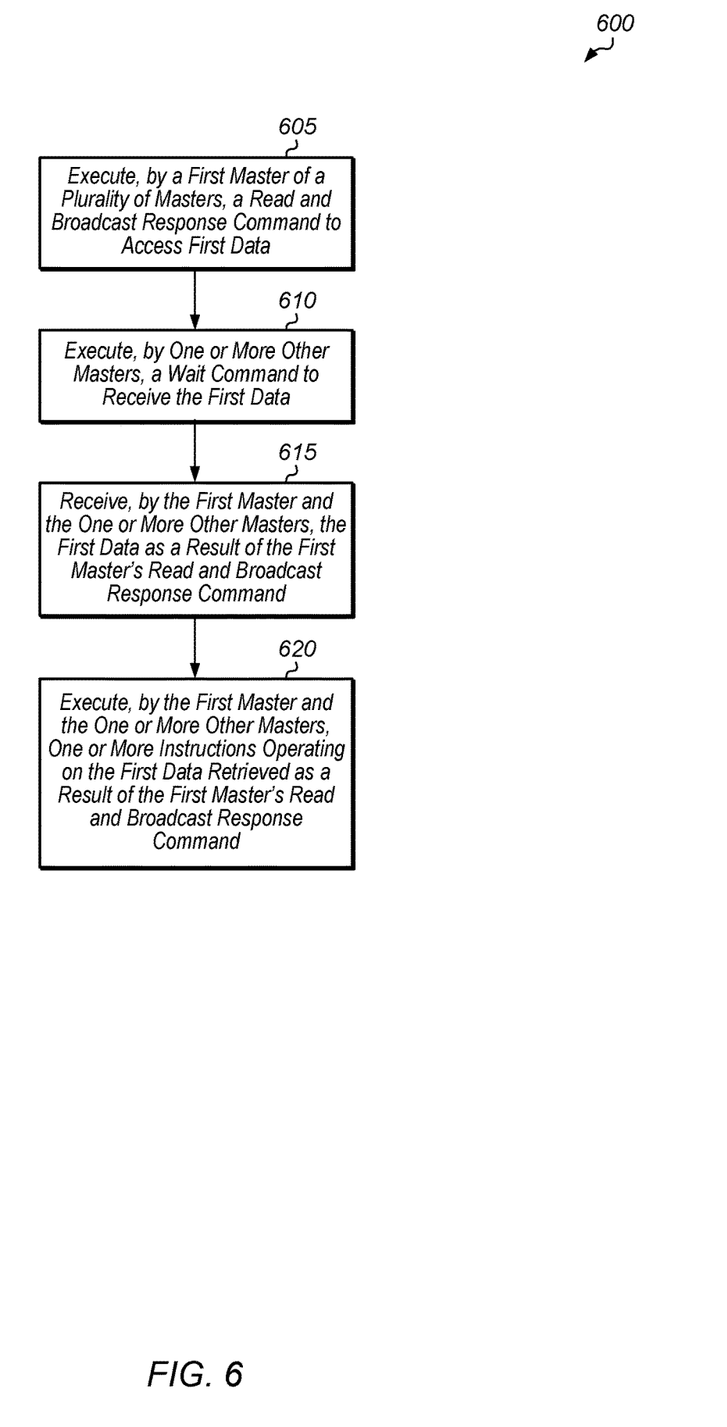
FIG. 6 is a generalized flow diagram illustrating another implementation of a method for implementing a broadcast read response protocol.
Figure 7:
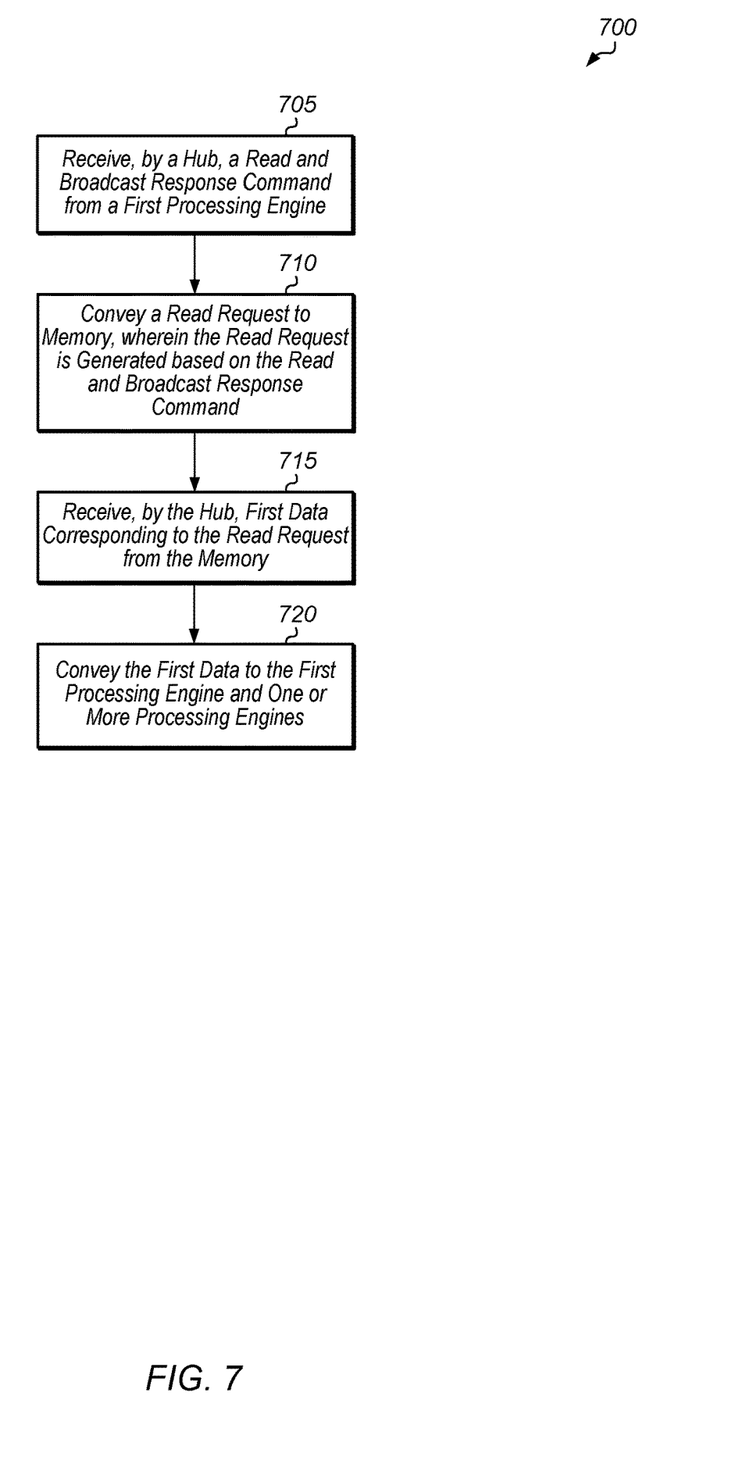
FIG. 7 is a generalized flow diagram illustrating one implementation of a method for a hub processing a read and broadcast response command.

Referring now to FIG. 5, one implementation of a method 500 for implementing a broadcast read response protocol is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A processing unit (e.g., processing unit 250 of FIG. 2) receives a software application to be executed by a plurality of processing engines (block 505). Any of various types of software applications (e.g., machine learning model) are received by the processing unit for executing by the plurality of processing engines. The processing unit determines if a condition for implementing a broadcast read response protocol is detected (conditional block 510). For example, in one implementation, the condition is the application being a machine learning model with multiple inference engines processing at least one or more common blocks of data. In other implementations, other conditions are detected in conditional block 510. If the condition for implementing the broadcast read response protocol is detected (conditional block 510, "yes" leg), then the processing unit designates a first processing engine of the plurality of processing engines as a primary processing engine (block 515). If the condition for implementing the broadcast read response protocol is not detected (conditional block 510, "no" leg), then the processing unit programs each processing engine to fetch its own data from memory (block 520).

After block 515, the processing unit conveys a read and broadcast response command to the first processing engine for execution by the first processing engine to retrieve first data from memory (block 525). Also, the processing unit conveys a wait command to one or more processing engines other than the first processing engine for execution by the one or more processing engines (block 530). Next, the plurality of processing engines receive the first data as a result of the read and broadcast response command executed by the first processing engine (block 535). Then, the plurality of processing engines process the first data as part of completing a first operation (block 540). After block 540, method 500 ends. In one implementation, the first operation is the implementation of a first layer of the machine learning model. In this implementation, method 500 can be performed for each layer of multiple layers of the machine learning model.

Turning now to FIG. 6, another implementation of a method 600 for implementing a broadcast read response protocol is shown. A first master, of a plurality of masters, executes a read and broadcast response command to access first data (block 605). One or more other masters execute a wait command to receive the first data (block 610). The first master and the one or more other masters receive the first data as a result of the first master's read and broadcast response command (block 615). Next, the first master and the other masters execute one or more instructions operating on the first data retrieved as a result of the first master's read and broadcast response command (block 620). In one implementation, a machine learning model is implemented based on the instructions for operating on the first data executed by the first master and the other masters. After block 620, method 600 ends.

Referring now to FIG. 7, one implementation of a method 700 for a hub processing a read and broadcast response command is shown. A hub (e.g., hub 210 of FIG. 2) receives a read and broadcast response command from a first processing engine (block 705). The hub conveys a read request to memory, wherein the read request is generated based on the read and broadcast response command (block 710). Next, the hub receives first data corresponding to the read request from the memory (block 715). Then, the hub conveys the first data to the first processing engine and one or more processing engines (block 720). After block 720, method 700 ends. In one implementation, identities of the one or more processing engines to which the hub conveys the first data are specified in the read and broadcast response command.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a processing unit; and
a plurality of processing engines;
wherein in response to a determination that one or more received instructions will cause multiple processing engines of the plurality of processing engines to execute a read command that accesses first data in a memory, the processing unit is configured to:
send a read and broadcast command to a first processing engine of the multiple processing engines; and
send a wait command to each of the multiple processing engines other than the first processing engine of the multiple processing engines;
wherein the first processing engine of the plurality of processing engines is configured to execute the read and broadcast response command to initiate broadcast of the first data from the memory; and
wherein the multiple processing engines other than the first processing engine are configured to execute a respective received wait command to receive the first data via the broadcast.

2. The system as recited in claim 1, wherein the processing unit is configured to convert the read command to be executed by the first processing engine to the read and broadcast command, and convert the read command to be executed by each of the multiple processing engines other than the first processing engine to a respective wait command.

3. The system as recited in claim 2, wherein the first operation is implementing a given layer of a machine learning model.

4. The system as recited in claim 3, wherein the given layer is a convolutional layer of a neural network.

5. The system as recited in claim 1, wherein the system further comprises a processing unit configured to designate the first processing engine as a primary processing engine responsive to detecting a condition for implementing a broadcast read response protocol.

6. The system as recited in claim 1, wherein the read and broadcast response command specifies to which one or more processing engines the first data should be conveyed.

7. The system as recited in claim 1, wherein the wait command is executable by the one or more processing engines to cause the one or more processing engines to wait for the first data to be received via broadcast.

8. A method comprising:
sending by a processing unit, in response to a determination that one or more received instructions will cause multiple processing engines of a plurality of processing engines to execute a read command that accesses first data in the memory, a read and broadcast command to a first processing engine of the multiple processing engines;
sending by the processing unit, in response to the determination, a wait command to each of the multiple processing engines other than the first processing engine of the multiple processing engines;
executing, by the first processing engine the read and broadcast response command to initiate broadcast of the first data from the memory;
executing, by the multiple processing engines of the plurality of other than the first processing engine, a respective received wait command to receive the first data via the broadcast.

9. The method as recited in claim 8, further comprising:
converting the read command to be executed by the first processing engine to the read and broadcast command; and
converting the read command to be executed by each of the multiple processing engines other than the first processing engine to a respective wait command.

10. The method as recited in claim 9, wherein the first operation is implementing a given layer of a machine learning model.

11. The method as recited in claim 10, wherein the given layer is a convolutional layer of a neural network.

12. The method as recited in claim 8, further comprising designating, by a processing unit, the first processing engine as a primary processing engine responsive to detecting a condition for implementing a broadcast read response protocol.

13. The method as recited in claim 8, wherein the read and broadcast response command specifies to which one or more processing engines the first data should be conveyed.

14. The method as recited in claim 8, further comprising executing, by each of the one or more processing engines, the wait command to cause each of the one or more processing engines to wait for the first data to be retrieved from the first address in the memory.

15. An apparatus comprising:
a first processing engine; and
a second processing engine;
wherein the first processing engine is configured to execute a read and broadcast response command, received from a processing unit and converted to the read and broadcast command from a read command by the processing unit, wherein the read and broadcast response command targets first data at a first address in a memory and causes a broadcast of the first data;
wherein the second processing engine is configured to execute a wait command, received from the processing unit and converted to the wait command from a read command by the processing unit, to receive the first data via the broadcast;
wherein the first processing engine and the second processing engine are configured to:
receive the first data via the broadcast as a result of the first processing engine executing the read and broadcast response command; and
process the first data as part of completing a first operation.

16. The apparatus as recited in claim 15, wherein the second processing engine receives the first data without generating a request for the first data.

17. The apparatus as recited in claim 16, wherein the first operation is implementing a given layer of a machine learning model.

18. The apparatus as recited in claim 17, wherein the given layer is a convolutional layer of a neural network.

19. The apparatus as recited in claim 15, wherein the read and broadcast response command specifies that the first data should be conveyed to the second processing engine.

20. The apparatus as recited in claim 19, wherein the wait command is executable by the second processing engine to cause the second processing engine to wait for the first data to be retrieved from the first address in the memory.

\* \* \* \* \*

UNITED STATES PATENT AND TRADEMARK OFFICE
CERTIFICATE OF CORRECTION

| | |
|---|---|
| PATENT NO. | : 11,275,632 B2 |
| APPLICATION NO. | : 16/171451 |
| DATED | : March 15, 2022 |
| INVENTOR(S) | : Christidis et al. |

It is certified that error appears in the above-identified patent and that said Letters Patent is hereby corrected as shown below:

In the Claims

Column 8, Claim 8, Lines 11-12, please delete "of the plurality of".

Signed and Sealed this
Thirty-first Day of May, 2022

*Katherine Kelly Vidal*

Katherine Kelly Vidal
*Director of the United States Patent and Trademark Office*